United States Patent [19]
Furlani et al.

[11] Patent Number: 5,535,181
[45] Date of Patent: Jul. 9, 1996

[54] PERMANENT MAGNET DEVICE FOR SELECTIVELY INVERTING A MAGNETIC BIAS FIELD FOR MAGNETO-OPTIC RECORDING

[75] Inventors: Edward P. Furlani, Lancaster; Christopher C. Williams; Syamal K. Ghosh, both of Rochester, all of N.Y.

[73] Assignee: Eastman Kodak Company, Rochester, N.Y.

[21] Appl. No.: 419,574

[22] Filed: Apr. 10, 1995

[51] Int. Cl.$^6$ ................................................ G11B 11/00
[52] U.S. Cl. .............................................. 369/13; 360/114
[58] Field of Search ............................... 369/13, 14, 110; 360/114, 59, 46; 365/122

[56] References Cited

U.S. PATENT DOCUMENTS

| | | |
|---|---|---|
| 4,972,337 | 11/1990 | Eguchi et al. ............................ 369/13 |
| 5,020,042 | 5/1991 | Fearnside et al. ........................ 369/13 |
| 5,291,345 | 3/1994 | Umeda et al. ............................ 360/59 |

*Primary Examiner*—Tan Dinh
*Attorney, Agent, or Firm*—Peyton C. Watkins

[57] ABSTRACT

An apparatus for selectively inverting an external magnetic field in a magneto-optic recording system so that information can be selectively recorded on or erased from a magneto-optic recording element of the system moving through the field, the apparatus comprises a permanent magnet including a first and second portion positioned adjacent to each other and each portion having north and south poles oriented along their cross-sectional dimension, wherein the north pole of the first portion is abuttingly adjacent to the south pole of the second portion, and the south pole of the first portion is abuttingly adjacent the north pole of the second portion; and a coil for imparting a magnetic field to the permanent magnet for moving the permanent magnet.

12 Claims, 2 Drawing Sheets

PERMANENT MAGNET DEVICE FOR SELECTIVELY INVERTING A MAGNETIC BIAS FIELD FOR MAGNETO-OPTIC RECORDING

CROSS-REFERENCE TO RELATED APPLICATIONS

The present invention is related to U.S. application Ser. No. 403,030, filed Mar. 13, 1995 by Edward P. Furlani and J. Kelly Lee, entitled AN APPARATUS FOR SELECTIVELY INVERTING A MAGNETIC BIASED FIELD FOR MAGNETO-OPTIC RECORDING; U.S. application Ser. No. 08/404,810, entitled AN APPARATUS FOR SELECTIVELY INVERTING A MAGNETIC BIASED FIELD FOR MAGNETO-OPTIC RECORDING, filed Mar. 15, 1995 by Edward P. Furlani and Christopher C. Williams; and U.S. application Ser. No. 08/414,705, entitled AN IMPROVED SYSTEM FOR SELECTIVELY INVERTING A MAGNETIC BIAS FIELD FOR MAGNETO-OPTIC RECORDING, filed Mar. 31, 1995 by Edward P. Furlani.

1. Field of the Invention

The invention relates generally to the field of magneto-optic recording and, more particularly, to a device for inverting a bias field for recording or erasure.

2. Background of the Related Art

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. When the coil is energized, the field that it creates imparts a torque to the magnet forcing it to rotate.

Although the presently known and utilized apparatus and method for rotating the magnet are satisfactory, they are not without drawbacks. First, the angular position of the cylindrical bias magnet needs to be controlled to a high degree of precision because the field that it generates at any given point varies substantially from its peak value over small angular excursions of a few degrees. Second, the magnetic coupling between the magnet and the coil is inefficient and requires substantial power. Third, the magnetic field from the coil permeates the surrounding region and can give rise to undesirable electromagnetic interference with neighboring electrical components thereby degrading their performance.

Consequently, a need exists for an apparatus for selectively inverting an external magnetic field in a magneto-optic recording system that does not require high precision movement, is energy efficient and reduces electromagnetic interference.

SUMMARY OF THE INVENTION

It is an object of the present invention to provide an apparatus for selectively inverting a magnetic bias field in a magneto-optical recording system that eliminates or reduces the above stated drawbacks.

It is an advantage of the present invention to provide an apparatus for selectively inverting an external magnetic field in a magneto-optic recording system, which does not require precise positioning control, and which is efficient to produce.

It is a feature of the present invention to provide a coil which imparts a torque to a bias magnet for rotating the permanent magnet.

With this and other objects in view, the present invention resides in an apparatus for selectively inverting an external magnetic field in a magneto-optic recording system so that information can be selectively recorded on or erased from a magneto-optic recording element of said system moving through said field, the apparatus comprises (a) a permanent magnet including a first and second portion positioned adjacent to each other and each portion having north and south poles oriented along their cross-sectional dimension, wherein the north pole of the first portion is abuttingly adjacent to the south pole of the second portion, and the south pole of the first portion is abuttingly adjacent to the north pole of the second portion; and (b) a coil positioned adjacent to said magnet which, when energized, imparts a magnetic field to said permanent magnet for moving said permanent magnet.

BRIEF DESCRIPTION OF THE DRAWINGS

In the course of the following detailed description, reference will be made to the attached drawings in which.

DETAILED DESCRIPTION OF THE PREFERRED EMBODIMENTS

Figure 1A:
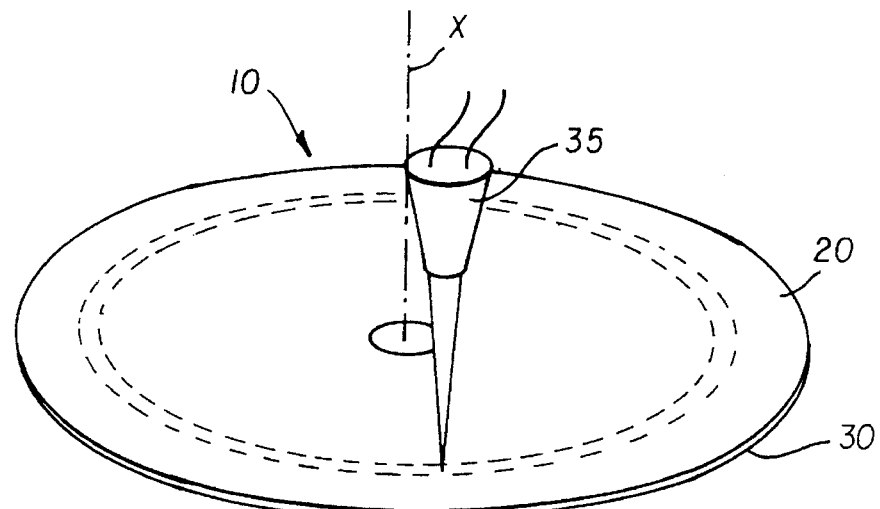
FIG. 1A is a perspective view of the present invention.
Figure 1B:
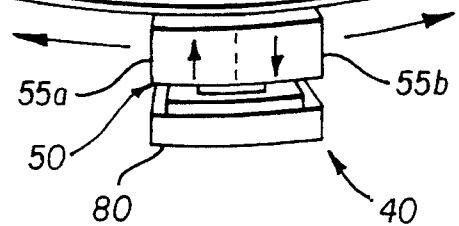
FIG. 1B is a perspective view of a bias magnet of the present invention and its pivot axis.

Referring to FIG. 1A, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 40 includes a wedge-shaped permanent magnet 50, which includes two adjacent, wedge-shaped portions 55a and 55b having north and south poles oriented along their cross-sectional dimension, which is radially disposed with respect to the rotating disk 10, and which serves to produce a magnetic bias field at recording layer 20. Although the magnet 50 is shown as wedge-shaped, it may be rectangular, square or any other similar shape. Referring to FIGS. 1A and 1B, magnet 50 is mounted for rotation about a pivot axis 60 so that the direction of the field may be switched from the upward direction in which segment 55a is beneath the write/erase spot on recording layer 20 to a downward direction in which the magnet 50 is rotated so that segment 55b is beneath the write/erase spot on recording layer 20, as will be described in detail below. The magnet 50 will cause magnetic domains in the recording element to flip orientations, e.g., from upward to downward, whenever the laser beam intensity is at its high level. In this manner, the digital information provided by the laser source 35 is magnetically recorded in the recording layer 20.

To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Figure 2A:
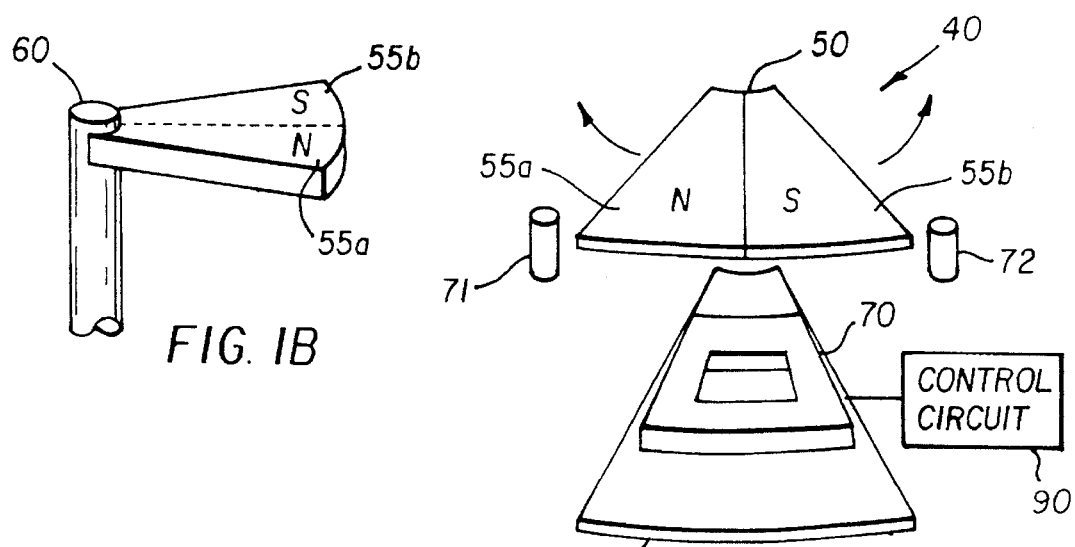
FIG. 2A is a perspective view of a portion of FIG. 1A illustrating the bias magnet.
Figure 2B:
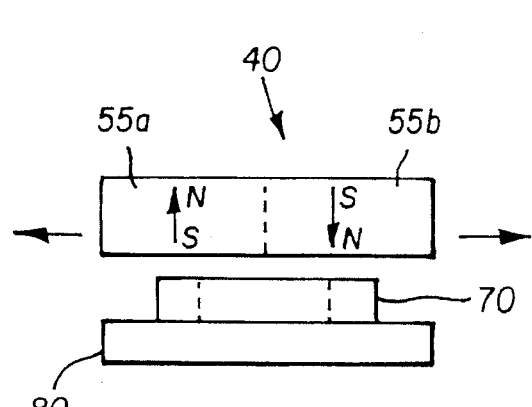
FIG. 2B is a front view of FIG. 2A.

Referring to FIGS. 2A and 2B, for rotating magnet 50, a closed loop, wedge shaped coil 70 is positioned beneath the magnet 50 and above a ferromagnetic flux plate 80 and resting thereon. Although the coil 70 is shown as wedge shaped, it may be rectangular, square or any other similar shape. To rotate the magnet 50, coil 70 is energized by a control circuit 90 which is well known in the art. When current flows in the coil 70, it gives rise to a magnetic field that interacts with the magnet 50 causing it to rotate either clockwise or counterclockwise (as illustrated by arrows) about the pivot axis 60. The direction of rotation of the magnet 50 depends on the direction of current flow in the coil 70. The flux plate 80 enhances the coupling between the magnet 50 and the magnetic field generated by coil 70 when it is energized thereby increasing the efficiency of the bias field device 40. It is instructive to note that the flux plate 80 may be omitted without significantly affecting the operation of the bias field device 40. The flux plate 80 also acts to partially shield neighboring electrical components from the electromagnetic interference (EMI) generated by the magnet 50 and the coil 70.

It is instructive to note that the magnet 50 may be positioned in either one of two positions. In the first position, portion 55a is beneath the write/erase spot on recording layer 20 and magnet 50 rests against stop 72. In the second position, portion 55b is beneath the write/erase spot on recording layer 20 and magnet 50 rests against stop 71. To rotate the magnet from one position to the other, coil 70 is energized for a period of time sufficient to cause rotation to the desired position.

Figure 3A:
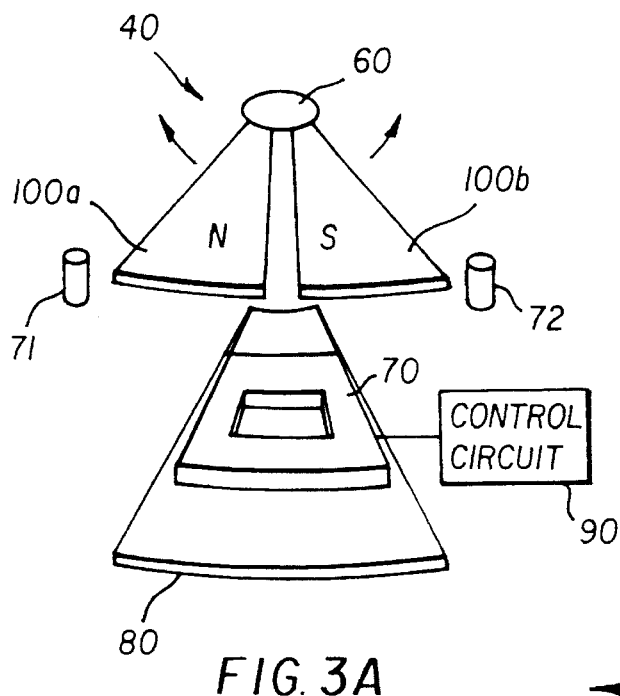
FIG. 3A is a perspective view of an alternative embodiment of the present invention.
Figure 3B:
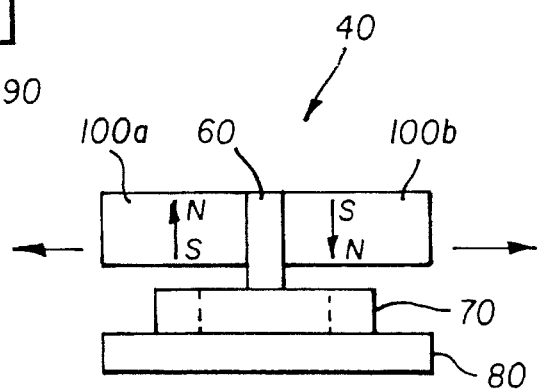
FIG. 3B is a front view of FIG. 3A.

Referring to FIGS. 3A and 3B, an alternative embodiment of the present invention is illustrated. Two magnets 100a and 100b are attached to and pivoted about the pivot axis 60. The magnet 100a functions the same as portion 55a of the preferred embodiment, and magnet 100b functions the same as portion 55b of the preferred embodiment. When current flows in the coil 70, it gives rise to a magnetic field that interacts with the magnets 100a and 100b causing them to rotate either clockwise or counterclockwise about pivot axis 60 (as illustrated by arrows).

Figure 4A:
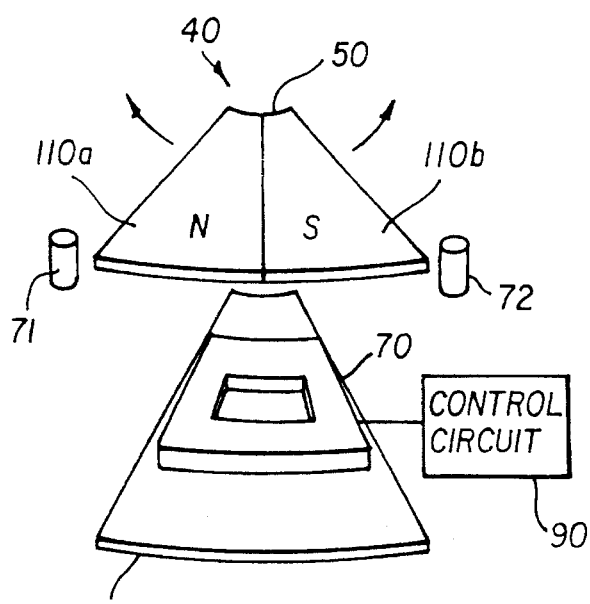
FIG. 4A is a perspective view of another alternative embodiment of the present invention.
Figure 4B:
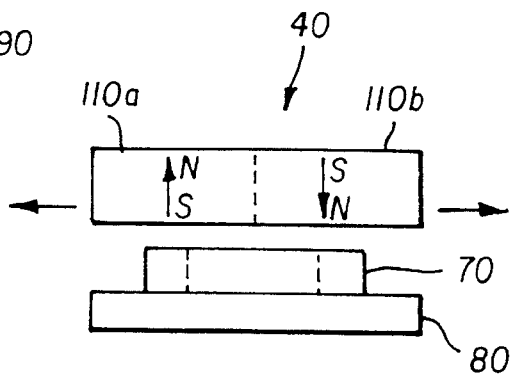
FIG. 4B is a front view of FIG. 4A.

Referring to FIGS. 4A and 4B, another alternative embodiment of the present invention is illustrated. Two magnets 110a and 110b abut each other and are attached to and pivoted about the pivot axis 60. The magnet 110a functions the same as portion 55a of the preferred embodiment, and magnet 110b functions the same as portion 55b of the preferred embodiment. When current flows in the coil 70, it gives rise to a magnetic field that interacts with the magnets 110a and 110b causing them to rotate either clockwise or counterclockwise (as illustrated by arrows)

It is thought that the present invention and many of its attendant advantages will be understood from the foregoing description and it will be apparent that various changes may be made in the form, construction and arrangement without departing from the spirit and scope of the invention or sacrificing all or any of its material advantages, the form hereinbefore described being merely a preferred or exemplary embodiment.

PARTS LIST 10 disk
20 recording layer
30 substrate
35 laser source
40 bias field device
50 magnet
55a portion of magnet 50
55b portion of magnet 50
60 pivot axis
70 coil
71 stop
72 stop
80 flux plate
90 control circuit
100a magnet
100b magnet
110a magnet
110b magnet

What is claimed is:

1. An apparatus for selectively inverting an external magnetic field in a magneto-optic recording system so that information is selectively recorded on or erased from a magneto-optic recording element of said system moving through said field, the apparatus comprising:

(a) a permanent magnet including a first and second portions positioned adjacent to each other and each portion having north and south poles oriented along their cross-sectional dimension, wherein the north pole of the first portion is abuttingly adjacent to the south pole of the second portion, and the south pole of the first portion is abuttingly adjacent the north pole of the second portion; and (b) a coil positioned adjacent to said magnet which, when energized, imparts a magnetic field to said permanent magnet for moving said permanent magnet.

2. The apparatus as in claim 1 further comprising a ferromagnetic plate, on which said coil rests, having a shape which enhances the coupling of the magnetic field of said coil to the polarized portions of said magnet.

3. The apparatus as in claim 1 further comprising a pivot axis attached to said magnet for permitting rotation of said magnet.

4. The apparatus as in claim 3, wherein said magnet is generally wedge shaped.

5. An apparatus for selectively inverting an external magnetic field in a magneto-optic recording system so that information is selectively recorded on or erased from a magneto-optic recording element of said system moving through said field, the apparatus comprising:

(a) a first and second permanent magnets in a spaced apart relationship with each other and both said magnets include north and south poles oriented along their cross-sectional dimension, wherein the north pole of said first magnet is disposed in a spaced apart relationship to the south pole of the second magnet, and the south pole of the first magnet is disposed in a spaced apart relationship to the north pole of the second magnet; and (b) a coil positioned adjacent to said magnets which, when energized, imparts a magnetic field to said permanent magnets for moving said permanent magnets.

6. The apparatus as in claim 5 further comprising a ferromagnetic plate, on which said coil rests, having a shape which enhances the coupling of the magnetic field of said coil to said magnets.

7. The apparatus as in claim 5 further comprising a pivot axis attached to said magnets for permitting rotation of said magnets.

8. The apparatus as in claim 7, wherein said magnets are generally wedge shaped.

9. An apparatus for selectively inverting an external magnetic field in a magneto-optic recording system so that information is selectively recorded on or erased from a magneto-optic recording element of said system moving through said field, the apparatus comprising:

(a) a first and second permanent magnets which abut each other and both said magnets include north and south poles oriented along their cross-sectional dimension, wherein the north pole of said first magnet is disposed in an abuttingly, adjacent relationship to the south pole of the second magnet, and the south pole of the first magnet is disposed in an abuttingly, adjacent relationship to the north pole of the second magnet; and (b) a coil positioned adjacent to said magnets which, when energized, imparts a magnetic field to said magnets for moving said magnets.

10. The apparatus as in claim 9 further comprising a ferromagnetic plate, on which said coil rests, having a shape which enhances the coupling of the magnetic field of said coil to said magnets.

11. The apparatus as in claim 9 further comprising a pivot axis attached to said magnets for permitting rotation of said magnets.

12. The apparatus as in claim 11, wherein said magnets are generally wedge shaped.

* * * * *